US009009733B2

(12) United States Patent
Xiques et al.

(10) Patent No.: US 9,009,733 B2
(45) Date of Patent: Apr. 14, 2015

(54) ON-LINE MEDIA PLAYER ARCHITECTURE

(75) Inventors: Christopher Peter Xiques, Oakland, CA (US); James Kong Hsu, Redwood City, CA (US)

(73) Assignee: CBS Interactive Inc., San Francisco, CA (US)

( * ) Notice: Subject to any disclaimer, the term of this patent is extended or adjusted under 35 U.S.C. 154(b) by 375 days.

(21) Appl. No.: 13/217,881

(22) Filed: Aug. 25, 2011

(65) Prior Publication Data

US 2012/0054777 A1 Mar. 1, 2012

Related U.S. Application Data

(60) Provisional application No. 61/377,210, filed on Aug. 26, 2010.

(51) Int. Cl.
*G06F 3/00* (2006.01)
*H04N 21/414* (2011.01)
*G06Q 30/02* (2012.01)
*H04N 21/431* (2011.01)
*H04N 21/81* (2011.01)
*H04N 21/8545* (2011.01)

(52) U.S. Cl.
CPC ......... *H04N 21/414* (2013.01); *G06Q 30/0277* (2013.01); *H04N 21/431* (2013.01); *H04N 21/812* (2013.01); *H04N 21/8166* (2013.01); *H04N 21/8545* (2013.01)

(58) Field of Classification Search
None
See application file for complete search history.

(56) References Cited

U.S. PATENT DOCUMENTS

| 7,440,674 | B2 | 10/2008 | Plotnick et al. | |
| 7,480,635 | B2 | 1/2009 | Saar et al. | |
| 7,831,469 | B2 | 11/2010 | Bhakta et al. | |
| 7,987,285 | B2 | 7/2011 | Melnyk et al. | |
| 7,991,904 | B2 | 8/2011 | Melnyk et al. | |
| 2002/0026638 | A1 | 2/2002 | Eldering et al. | |
| 2006/0041593 | A1* | 2/2006 | Borthakur et al. | 707/200 |
| 2006/0155814 | A1* | 7/2006 | Bennett et al. | 709/207 |
| 2007/0157295 | A1* | 7/2007 | Mangalore et al. | 726/6 |
| 2008/0052323 | A1* | 2/2008 | Dodge et al. | 707/201 |
| 2008/0086505 | A1* | 4/2008 | McKellar et al. | 707/104.1 |
| 2008/0144604 | A1* | 6/2008 | Sharma et al. | 370/352 |
| 2008/0307454 | A1* | 12/2008 | Ahanger et al. | 725/36 |
| 2009/0019178 | A1 | 1/2009 | Melnyk et al. | |

(Continued)

OTHER PUBLICATIONS

"JW Player 5 for Flash & HTML5," 2011, LongTail Ad Solutions, 3 pages, [Online] [Retrieved May 1, 2012] Retrieved from the Internet<URL:http://www.longtailvideo.com/support/jw-player/jw-player-for-flash-v5/17678/flash-plugin-api-events>.

(Continued)

*Primary Examiner* — Camquy Truong
*Assistant Examiner* — Mehran Kamran
(74) *Attorney, Agent, or Firm* — Fenwick & West LLP

(57) ABSTRACT

Event-based communication in a media player architecture. The architecture can include a series of modules. The technology can define media player events, at least in part by defining event notifications and event handling processes. The various modules can register as one or both of an issuer of at least one media player event notification, and a subscriber to at least one published media player event notification. When an event occurs in a module, the module issues an event notification that is then handled by a handling process. The event handling process(es) publish the event to subscribing modules, and in some cases perform processing on the event notification before publishing.

10 Claims, 8 Drawing Sheets

(56) References Cited

U.S. PATENT DOCUMENTS

| | | | |
|---|---|---|---|
| 2009/0254657 A1 | 10/2009 | Melnyk et al. | |
| 2009/0265734 A1* | 10/2009 | Dion et al. | 725/34 |
| 2010/0135473 A1* | 6/2010 | Dewing et al. | 379/88.13 |
| 2011/0035462 A1* | 2/2011 | Akella | 709/217 |
| 2011/0282921 A1* | 11/2011 | Dodge | 707/822 |
| 2012/0054045 A1* | 3/2012 | Beining et al. | 705/14.73 |
| 2012/0059697 A1 | 3/2012 | Lin et al. | |
| 2012/0185473 A1* | 7/2012 | Ponting et al. | 707/728 |

OTHER PUBLICATIONS

Adobe Systems Inc.: "Using Adobe Flash CS4 Professional," Mar. 5, 2009, [Online] [Retrieved on Feb. 2, 2012] Retrieved from the Internet<URL:http://help.adobe.com/en_US/Flash/10.0UsingFlash/flash_cs4_help.pdf>.

Adobe Systems Inc.: "Programming Adobe ActionScript 3.0," Feb. 11, 2009, [Online] [Retrieved on Feb. 2, 2012] Retrieved from the Internet<URL:http://help.adobe.com/en_US/ActionScript/3.0_ProgrammingAS3/flash_as3_programming.pdf>.

Adobe Systems Inc.: "Using Adobe Actionscript 3.0 Components," Sep. 17, 2008, [Online] [Retrieved on Feb. 2, 2012] Retrieved from the Internet<URL:http://help.adobe.com/en_US/ActionScript/3.0_UsingComponentsAS3/flash_as3_compontents_help.pdf>.

CNET Networks: "CNET Networks' Flash Tracking Solution," Dec. 12, 2007, [Online] [Retrieved on Feb. 3, 2012] Retrieved from the Internet<URL:http://www.cbsinteractive.cmo/advertise/flash_setup_and_tracking/documentation.pdf>.

PCT International Search Report and Written Opinion, PCT Application No. PCT/US2011/049216, Feb. 10, 2012, 12 pages.

Eldering et al., U.S. Appl. No. 09/742,506, Drawings—only black and white line drawings, Whole Document, Apr. 16, 2001, 4 pages.

* cited by examiner

ON-LINE MEDIA PLAYER ARCHITECTURE

CROSS REFERENCE TO RELATED APPLICATIONS

This application claims the benefit of U.S. Provisional Patent Application No. 61/377,210, filed Aug. 26, 2010, referred to herein as the "Provisional Application," the disclosure of which is incorporated herein by reference in its entirety.

FIELD

The technology relates to an architecture for media player components.

COPYRIGHT NOTICE

This application contains copyrighted material. The Applicant does not object to reproduction of any publication of this application in its entirety. However, the Applicant does not otherwise waive any copyright in the material presented in this application.

DETAILED DESCRIPTION

Figure 1:
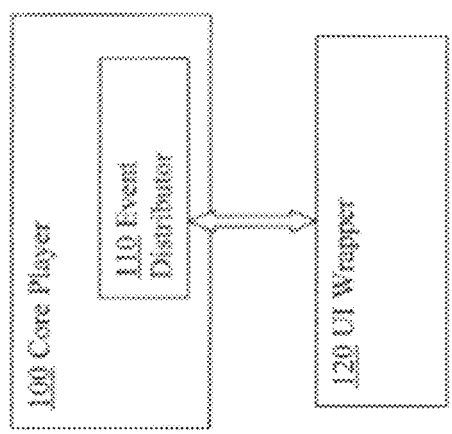
FIG. 1 is a schematic diagram of a computer architecture for interfacing a UI wrapper with a media player.

The disclosed embodiments can include a video player architecture and communications platform that is efficient, flexible, scalable, and extensible. Accordingly, the embodiments can provide for communication between video players, skins, advertising networks, tracking mechanisms, content providers, and other existing and future parts of an on-line video platform. The can utilizes an event-based communication system that provides for a standard messaging protocol. While the embodiments are described in connection with a "video player," the embodiments can be implemented in connection with any type of media player.

The internet has become one of the most popular methods of distributing content. Most internet content distributors rely on an advertising model for revenue. In other words, much of the content is available to users without charge. However, the distributor or site owner sells advertisements that are displayed to users.

There are two primary ad revenue models on the internet, CPM and CPC. "CPM" stands for "cost per thousand" (where M denotes 'Milli'). In this model, the site owner charges advertisers a rate (for example 10 cents per thousand) based on the number of its ads shown to site visitors. "CPC" stands for 'Cost per Click.' In this model Advertisers are charged based on the number of times users click on links in the ads. Ads may be served by the site owners or through a third-party ad network service such as Google ADSENSE™. As video content becomes more popular, ads integrated into, or otherwise coordinated with, video content have become more valuable. According to EMARKETER™, online video advertising in the U.S. alone is estimated to reach $1.5 billion in 2010.

Media, such as video and audio, is displayed on a web site using an application called a "media player," such as the ADOBE MEDIA PLAYER™ or the WINDOWS MEDIA PLAYER™. There are many available video players and many video formats. Not all video players support all formats. Accordingly, there is an interoperability issue for video and other media on the web. Also, branding has become an issue. In particular web site owners want the media player on their site to look seamless and to include the look and feel of the site design. The use of "skins" is known to wrap the media player in a UI that looks like the web site. However, this increases the complexity of a media player implementation.

An object oriented language called ACTIONSCRIPT™ provides a mechanism for event-based communication in order to facilitate communication between programmatic entities, such as a skin and a media player. The skin can be registered to listen for events from the specific player that it wants to communicate with, and vice versa. The skin and player must register with one another on a one-to-one basis in order to establish this communication. These events merely tell the other element that something has happened, for example, that a video has completed play. While providing rudimentary communication between elements, this is a complex and resource intensive process because an element must register on a one-to-one basis with another element. Further, the need to track and audit ad consumption to support the revenue models noted above creates additional complexity and interoperability issues. These and other factors are driving a need for a media player architecture that is modular, e.g., can accommodate additional functionality and higher throughput for existing functions, e.g., ad serving, tracking, social network functions, without an architecture redesign each time new functionality is added.

The technology disclosed herein includes computer implemented methods, computer program products, and systems for event-based communication in a media player architecture. The architecture can include a series of modules. The technology can define media player events, at least in part by defining event notifications and event handling processes. The various modules can register as one or both of an issuer of at least one media player event notification, and a subscriber to at least one published media player event notification. When an event occurs in a module, the module issues an event notification that is then handled by a handling process. The event handling process(es) publish the event to subscribing modules, and in some cases perform some processing on the event notification before publishing.

Figure 8:
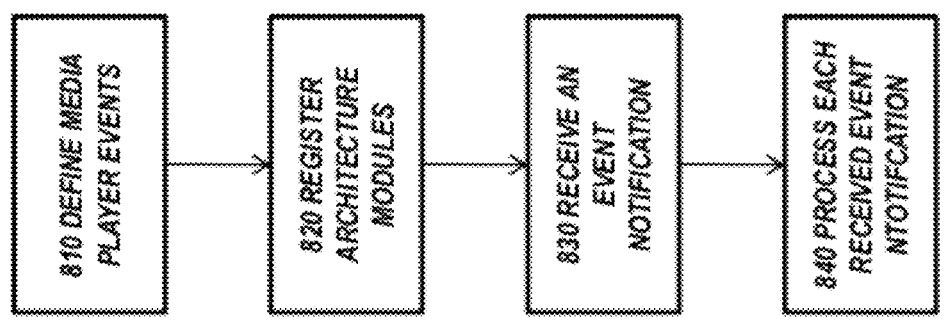
FIG. 8 illustrates methods of the technology.

As illustrated in FIG. 1 and FIG. 8 a video player implementation can include core video player 100 that is "chromeless," i.e., has no visible user interface (UI) elements. The visible graphical interface features of an application are sometimes referred to as "chrome". The implementation also includes wrapper 120 that can provide the function of a skin to implement the desired user interface, provide physical ad placement, and any other business specific logic. Core video player 100 and wrapper 120 can each be implemented as a separate SWF file. SWF is a partially open repository for multimedia and vector graphics intended to be small enough for publication on the web. SWF files can contain animations or applets of varying degrees of interactivity and function. The disclosed embodiments provide for flexible and open communication between SWF files or other "plug-in" components.

Communication between core video player 100 and wrapper 120 is accomplished using a publish/subscribe event-based messaging system. The technology defines media player events, at least in part by defining, at least one media player event notification, and at least one media player event handling processes for each event 810. The messaging system is implemented through event distributor 110 of core video player 100. In particular, when specified actions occur in core player 100, or other elements associated with various entities discussed below, an event is sent out. The event can be published to a "bus," i.e. one or more channels that can be monitored, for elements interested in the event, i.e. "listening" for the event, to "hear" the event. The event can also include "payload data," also called, "attributes," of the event which is described in greater detail below.

The various elements that wish to consume information can be registered 820 dynamically with event distributor 110. As part of this registration process the various elements, such as wrapper 120, can register for specific types of messages that they wish to receive. As a simple example, wrapper 120 can register to receive an event indicating that a portion of a video file adequate to begin playing the video file has been cached. Upon receipt of such an event, the UI displayed by wrapper 120 could change the PLAY button from grayed out to full contrast display, indicating that it is ready to receive a command from the user to play the video content.

Event distributor 110 can disseminate information by sending 840 and receiving 830 one-way events to/from the other elements, such as wrapper 120, that are registered to receive the type of events. Significantly, an element need not even know of the existence of another element from which it receives events. If the first element is registered to receive a type of event that is transmitted from the second element, the first element can receive the event. More than one element can be registered to receive the same events. The event format, types, attributes, transport binding, and the like can be standardized. Event distributor 110 can specify a standard set of messages. Elements that implement these messages will be able to exchange notifications. Event distributor 110, described in greater detail below, is shown in FIG. 1 as being part of core player 100. However, event distributor 100 is a centralized element and can exist at any physical location and in any abstraction arrangement. For example, event distributor 10 need not be part of the code of core player 100 or reside on the same physical device as core player 100, to the extent permissible by the programming language and architecture.

Some embodiments have a specified list of events that can be handled by event distributor 110. This list can be updated dynamically as, for example, a new type of functionality is added to the architecture. Event distributor 110 can be implemented as a shared class. For example, the class EventDistributor is the central class that handles event dispatching and listening in video player architecture. An element that wants to listen for an event in the architecture can add a listener to the EventDistributor. Any entity that wants to dispatch an event into the architecture can implement the specified interface and register its dispatchable events with the EventDistributor class. An example of code defining event distributor 110 is set forth below:

---

Public Methods
    Method Defined by
        EventDistributor( )
Constructor. EventDistributor
    getInstance( ):EventDistributor
[static] Implements the Singleton design pattern. EventDistributor
    registerDispatcher( disp: EventDispatcher) :void
Allows any entity in UVP to register static event types as 'dispatchable'.
EventDistributor
    unregister Dispatcher( disp: EventDispatcher): void
Allows any entity in UVP to unregister static event types as 'dispatchable'.
EventDistributor
Constructor detail
EventDistributor ( ) constructor
public function EventDistributor( )
Constructor.
Method detail
getInstance ( ) method
public static function getInstance( ):EventDistributor
Implements the Singleton design pattern.
Returns EventDistributor
registerDispatcher ( ) method
public function registerDispatcher(disp:EventDispatcher):void

---

Allows any entity in UVP to register static event types as 'dispatchable.' The Event Distibuter will add an event listener to the entity for each 'registered' event type. When the entity dispatches events with event types it has marked as dispatchable, the Event Distibuter will dispatch these events to other interested entities.

---

Parameters disp:EventDispatcher
    See also
        com.cbsi. universal ~layer .events. IDispatchable
    unregisterDispatcher ( ) method
    public function unregisterDispatcher(disp:EventDispatcher):void

---

Allows any entity in UVP to unregister static event types as 'dispatchable.' The event distributer will remove event listeners from the entity and no longer dispatch events dispatched by that entity.

---

Parameters disp:EventDispatcher
    See also com.cbsi.universal_player.events.IDispatchable

---

An event class can be defined that is used by event distributor 110 for dispatched events. An example of code for this class is set forth below:

---

Public Properties
    Property Defined by
        data: Object
[read-only] Returns the data for the event, which can differ based on the event type.
CBSI_Player_Event
    subType: String
[read-only] Returns the subType for the event. CBSI_Player_Event
Public Methods
    Method Defined by
        CBSI_Player_Event(typ:String, sub: String = null, d:Object
        null, bbl:Boolean = false, cncl:Boolean = false)
Constructor. CBSI_Player_Event
Public Constants
    Constant Defined by
        INTERNAL: String "internal"
[static] The CBSI_Player_Event.INTERNAL constant defines the value of the CBSI_Player _Event's subType property, which indicates that this instance of the event is meant to be a UVP internal event -continued CBSI_Player_Event.
 PUBLIC: String = "public"
[static] The CBSI_Player_Event.PUBLIC constant defines the value of the CBSI_Player_Event's subType property, which indicates that this instance of the event is publicly available to any entity listening for a CBSI Player_Event.
Property detail
data property
data:Object [read-only]

Returns the data for the event, which can differ based on the event type. See the event constants in com.cbsi.universal_layer.events.EventTypes class for a description of the data object for each event type.

```
Implementation
    public function get data( ):Object
See also
com.cbsi.universal_layer.events.EventTypes
subType property
subType: String [read-only]
```

Returns the subType for the event. The subtype determines whether the event is broadcast only within the video player ("VP") or whether it can be listened for entities outside of UVP (plugins, JavaScript, etc.).

Implementation
 public function get subTypeC):String
Constructor detail
CBSI Player Event ( ) constructor
public function CBSI_Player_Event(typ:String, sub:String = null, d:Object = null, bbl:Boolean = false, cncl:Boolean false)
Constructor
Parameters typ:String One of the event type constants defined in com.cbsi.universal~layer.events.EventTypes.
substring (default = null) - The subtype of the event, PUBLIC or INTERNAL.
d:Object (default = null) - Corresponding data for the event. This can differ depending on the event type. See the event type definitions in com.cbsi.universal~layer.events.EventTypes.
bbl:Boolean (default false)
cncl:Boolean (default = false)
Constant detail
INTERNAL constant
public static const INTERNAL: String = "internal"

The CBSI_Player_Event.INTERNAL constant defines the value of the CBSI_Player_Event's subType property, which indicates that this instance of the event is meant to be a UVP internal event

```
PUBLIC constant
public static const PUBLIC:String = "public"
```

The CBSI_Player_Event.PUBLIC constant defines the value of the CBSI_Player_Event's subType property, which indicates that this instance of the event is publicly available to any entity listening for a CBSI_Player_Event.

Event types supported by the event distributor can be defined as a set of constants. Examples are set forth below:

| Package | com.cbsi.universal player.events |
|---|---|
| Class | public class EventTypes |

The central list of public static event types that are used when dispatching a CBSI_Player Event. The public static constants in this class define the value of the type property of a CBSI_Player_Event. See also com.cbsi.universal_player.events.CBSI_Player_Event, com.cbsi.universal player.events.EventDistributor.

```
AD END        constant
public static canst AD_END:String = "onAdEnd_cbsi"
```

Events of this type can be dispatched when an ad clip has completed playback. The data property for an event of this type a CBSI_Video_Info object. See also com.cbsi.universal player.vo.CBSI_Video_Info.

```
AD_LOAD_REQUEST     constant
public static canst AD_LOAD_REQUEST:String "adLoadRequest"
AD RESOURCES INFO   constant
public static canst AD_RESOURCES_INFO:String = "anAdResourcesinfo"
```

Dispatched after Ad Server Plugin [130] parses the ad xml, The AD_RESOURCES_INFO event.data contains an array of CBSI_AdResource_Info objects populated with Ad Resources properties. See also CBSI AdResource Info.

```
AD_RESOURCES_LOADED    constant - -
public static canst AD_RESOURCES_LOADED:String = "onAdResourcesLoaded"
```

Dispatched by Ad Server Plugin [130] after ad assets have finished downloading. In the case of videos, it indicates the video player is initializing with a video URL. The AD_RESOURCES_LOADED event.data contains an array of CBSI_AdResource_Info objects. See also CBSI AdResource Info

```
AD_START       constant
public static canst AD_START:String = "anAdStart cbsi"
```

Events of this type are dispatched every time an ad clip has fully buffered and begins playback. The data property for an event of this type a CBSI_Video_Info object. See also com.cbsi.universal player.vo.CBSI_Video_Info

```
AD_VIDEO_REQUEST    constant
public static constant AD_VIDEO_REQUEST:String = "adVideoRequest"
```

Dispatched when an ad plugin wants to create a new video player for an ad video.event.data is a Video Info object. See also com.cbsi.universal~layer.vo.CBSI_Video_Info CBSI_Video_Info

```
BITRATE_SWITCH_REQUEST constant
public static canst BITRATE_SWITCH_REQUEST:String "bitrateSwitchRequest"
```

Events of this type are dispatched to request a 'manual' dynamic switch from one bitrate to another. The data property for an event of this type can be a String (either "up" or "down"). This will request a switch to the next highest or next lowest index. The data property for an event of this type can also be a Integer to request a switch a particular index. The term index refers to the index of the CBSI_Video_Info dsiInfo Array that contains the information for the stream being switched to. See also com.cbsi.universal player.vo.CBSI_Video_Info.dsiInfo

```
CBSI_EVENTS_AVAILABLE    constant
public static const CBSI_EVENTS_AVAILABLE:String
   "cbsiEventsAvailable"
```

This is the only eventType that is not used when dispatching an event through the Event Distributor. Events of this type are dispatched once at startup directly by UVP. The data property for an event of this type is an instance of the Event Distributor. See also com.cbsi.universal_player.events.EventDistributor

```
CONTENT_END    constant
public static const CONTENT_END:String = "onContentEnd_cbsi"
```

Events of this type are dispatched every time a content clip has ended or paused before an ad. The data property for an event of this type a CBSI_Video_Info object. See also com.cbsi.universal player.vo.CBSI_Video_Info

```
CONTENT_LOAD REQUEST    constant
public static const CONTENT_LOAD_REQUEST:String =
   "contentLoadRequest"
```

Events of this type are dispatched whenever a request is made to load a content video or image. The data property for an event of this type is either a CBSI_Video_Info object or a CBSI_Image_Info. Requesting entity should populate basic 'startup' info for the data object and retain a reference to the data object for the life of the requested content asset.

Use these lines to request a video using a platform PID:

```
var videoInfo:CBSIVideoInfo = new CBSIVideoInfo( );
videoInfo.videoID = pID;
videoInfo.startTime = 60;
videoInfo.endTime = 30;
this.dispatchEvent(EventTypes.CONTENT_LOA~_REQUESTf
   CBSI_Player_Event.PUBLIC, videoInfo);
```

Or use these lines to request a video for which the url is known:

```
var videoInfo:CBSIVideoInfo = new CBSIVideoInfo( );
videoInfo.isAd = false;
videoInfo.isRtmp = false;
videoInfo.assetURL =
   .. http://www.somedomain.com/videos/first_video.flv .. ;
this.dispatchEvent(EventTypes.CONTENT_LOAD_REQUEST,
   CBSI_Player_Event.PUBLIC,videoInfo);
```

Or use these lines to request a preview image using a platform PID

```
var imageInfo:CBSI_Image_Info = new CBSI_Image_Info( );
imageInfo.assetID = pID;
imageInfo.assetURL = "cue";
this.dispatchEvent(EventTypes.CONTENT_LOAD_REQUEST,
   CBSI Player_Event. PUBLIC, videoInfo);
```

OR use these lines to request a preview image for which the URL is known

```
var imageInfo:CBSI_Image_Info = new CBSI_Image_Info( );
imageInfo.assetURL =
   .. http://www.somedomain.com/images/screen_grab . jpg ";
imageInfo.imageHeader= "CBS announces new player";
this.dispatchEvent(EventTypes.CONTENT_LOAD_REQUEST,
   CBSI_Player Event. PUBLIC, videoInfo);
```

See also com.cbsi.universal player.vo.CBSI_Video_Info, and com.cbsi.universal player.vo.CBSI Image Info

```
CONTENT START    constant
public static const CONTENT_START:String = "onContentStart_cbsi"
```

Events of this type are dispatched every time a content clip has started or resumed after an ad. The data property for an event of this type a CBSI_Video_Info object. See also com.cbsi.universal player.vo.CBSI_Video_Info.

```
MAXIMUM_BITRATE_ALLOWED    constant
public static const MAXIMUM_BITRATE ALLOWED: String
   "maximumBitrateAllowed"
```

Events of this type are dispatched to set a maximum index for auto dynamic bitrate switching. The data property for an event of this type is an integer that represents a valid index in the CBSI_Video_Info.dsiInfo Array. See also com.cbsi.universal player.vo.CBSI_Video_Info.dsiInfo

```
MINIMUM_BITRATE_ALLOWED    constant
public static const MINIMUM_BITRATE_ALLOWED:String
   "minimumBitrateAllowed"
```

This constant defines the value of the type property of a CBSI_Player_Event. Events of this type are dispatched to set a minimum index for auto dynamic bitrate switching. The data property for an event of this type is an integer that represents a valid index in the CBSI_Video_Info.dsiInfo Array. See also com.cbsi.universal player.vo.CBSI_Video_Info.dsiInfo

```
OVERLAY_RELEASE    constant
public static const OVERLAY_RELEASE:String =
   "onOverlayEnd_cbsi"
```

Events of this type are dispatched every time non-video ad creative that was completely covering a content clip in progress is removed. The data property for an event of this type an integer. 0 is sent when the 'takeover' creative was displayed within UVP. 1 is sent when the 'takeover' creative was displayed outside UVP (i.e. the containing page).

```
OVERLAY_TAKEOVER    constant
public static const OVERLAY_TAKEOVER:String
   "onOverlayStart_cbsi"
```

Events of this type are dispatched every time non-video ad creative completely covers a content clip in progress. The data property for an event of this type an integer. 0 is sent when the 'takeover' creative is displayed within UVP. 1 is sent when the 'takeover' creative is displayed outside UVP. (i.e., the containing page).

PLAY BACK_ DURATION-_PERCENT constant
public static const PLAYBACK_DURATION_PERCENT:String = "playbackDuration-Percent"

Events of this type are dispatched during playback of content and ad videos at every 10 percent interval as long as clip duration>=10. The data property for an event of this type a CBSi_Video_Info object. To obtain the duration info look for CBSi_Video_Info.lastPercentageCompleted. See also com.cbsi.universal player.vo.CBSI Video Info.lastPercentageCompleted PLAYBACK_DURATION_SECONDS constant
public static const PLAYBACK_DURATION_SECONDS:String ="playbackDurationSeconds"

Events of this type are dispatched during playback of content and ad videos every 15 seconds for the first minute of playback and once every minute after that. The data property for an event of this type a CBSi_Video_Info object. To obtain the duration info look for CBSi_Video_Info.lastSecondCompleted. See also com.cbsi.universal player.vo.CBSI_Video_Info.lastSecondCompleted PLAYER_LOADED constant
public static const PLAYER_LOADED:String = "onPlayerLoaded_cbsi"

This constant defines the value of the type property of a CBSiPlayer_Event. Events of this type are dispatched once at startup when UVP becomes available to accept requests from outside entities. The data property for an event of this type is null.

PLAYLIST_END constant
public static const PLAYLIST_END:String = "onPlayListEnd_cbsi"

Events of this type are dispatched every time a playlist generated by The Platform cms has completed playback. The data property for an event of this type is null.

PLAYLIST_START constant
public static const PLAYLIST_START:String = "onPlaylistStart_cbsi"

Events of this type are dispatched every time a playlist generated by The Platform cms has commenced playback. The data property for an event of this type is null.

PLUGINS_AVAILABLE constant
public static const PLUGINS_AVAILABLE:String = "pluginsAvailable"

Events of this type are dispatched once at startup when UVP plugins have been loaded by the shared plugin loader. The data property for an event of this type is a data dictionary that contains a reference to plugin swfs loaded by the shared plugin loader. See also com.cbsi.universal~layer.utils.PluginLoader.

RESIZE constant
public static const RESIZE:String := "resize"

Events of this type are dispatched when a request is issued to resize the video display rectangle of the skin. The data property for an event of this type is an Array of the following form: [width, height, x, y]. If x and y are not specified they are set to 0.

SCRUB DONE constant
public static const SCRUB_DONE:String := "scrubDone"

Events of this type should be dispatched whenever the user completes a seek gesture when the seek bar is programmed to 'scrub.' The event can be proceeded by a SCRUB START event. Typically a seek bar is programmed to send one USER_SEEK event when the mouse is released. If the seek bar is programmed to 'scrub,' USER_SEEK events are sent continuously as long as the mouse remains down. The data property for an event of this type is an integer that represents final requested seek time for the video being scrubbed. See also com.cbsi.universal_player.events.EventTypes.userSeek, and com.cbsi.universal_player.events.EventTypes.scrubStart.

SCRUB START constant
public static const SCRUB_START:String := "scrubStart"

Events of this type should be dispatched whenever the user mouses down on a seek bar that is programmed to 'scrub' the current video. Scrubbing can be terminated by a SCRUB DONE event. Typically a seek bar is programmed to send one USER_SEEK event when the mouse is released. If the seek bar is programmed to 'scrub,' USER_SEEK events are sent continuously as long as the mouse remains down. The data property for an event of this type is an integer that represents the current time of the video being scrubbed at the time of the mouse down event. See also com.cbsi.universalplayer.events. Event Types. userSeek, and com.cbsi.universal.player.events.EventTypes.scrubDone SURVEY_LOAD_REQUEST constant
public static const SURVEY LOAD_REQUEST:String := "surveyLoadRequest"
TRACK SUBMIT constant
public static const TRACK_SUBMIT:String := "trackSubmit"

Events of this type are dispatched whenever 'trackable' information needs to be sent to the central UVP Tracker. The data property for an event of this type is a UVP TrackSubmission. See also com.cbsi.universalplayer. track.TrackSubmission, and com.cbsi.universalplayer.model.track.Tracker USE DYNAMIC SWITCHING constant
public static const USE_DYNAMIC SWITCHING:String "useDynamicSwitching"

Events of this type are dispatched to toggle auto dynamic bitrate switching on or off. The data property for an event of this type is a Boolean. A value of false tells UVP to only switch bitrates when requested to. A value of true tells UVP to use its internal switching rules to dictate bitrate switches.

USER_CLEAR constant
public static const USER_CLEAR:String = "userClear"

Events of this type are dispatched when a clear command is issued from outside of UVP. The video will be stopped and the net connection will be dropped and the video image will be removed. The data property for an event of this type is null.

USER_FULLSCREEN constant
public static const USER_FULLSCREEN:String = "userFullscreen"

Events of this type are dispatched when a user requests a change to or from the full screen state. The data property for an event of this type is a Boolean.

USER_GESTURE constant
public static const USER_GESTURE:String = "userGesture"

Events of this type are dispatched by entities outside UVP to communicate user interaction info to UVP tracking classes. The data property for an event of this type is an Array of the following form: [gestureType, info 1, inf02, . . . ].

USER_MUTE constant
public static const USER_MUTE:String = "userMute"

Events of this type are dispatched when a mute command is issued from outside of UVP. The data property for an event of this type is null.

USER_PAUSE constant
public static const USER_PAUSE:String = "userPause"

Events of this type are dispatched when a pause command is issued from outside of UVP.
The data property for an event of this type is null.

USER_PLAY constant
public static const USER_PLAY:String = "userPlay"

Events of this type are dispatched when a play command is issued from outside of UVP. The data property for an event of this type is null.

USER_SEEK constant
public static const USER_SEEK:String = "userSeek"

Events of this type are dispatched when a seek command is issued from outside of UVP. The data property for an event of this type is an Integer representing the requested seek time in seconds.

USER_STOP constant
public static const USER_STOP:String = "userStop"

Events of this type are dispatched when a stop command is issued from outside of UVP. The video will be stopped and the net connection will be dropped. The data property for an event of this type is null.

USER_UNMUTE constant
public static const USER UNMUTE:String = "userUnmute"

Events of this type are dispatched when an unmute command is issued from outside of UVP. The data property for an event of this type is null.

USER_VOLUME CHANGE constant
public static const USER_VOLUME_CHANGE:String = "userVolumeChange"

Events of this type are dispatched when a volume change is requested from outside of UVP. The data property for an event of this type is a Number between 0 and 1.

VIDEO_CUEPOINT constant
public static const VIDEO_CUEPOINT:String = "onVideoCuePoint"

Events of this type are dispatched when an embedded video cue point is encountered during video playback. The data property for an event of this type is a standard AS3 cue point object.

VIDEO DONE constant
public static const VIDEO_DONE:String = "onVideoDone"

Events of this type are dispatched when playback of content and ad video has completed. The data property for an event of this type is a CBSI_Video_Info object. See also com.cbsi.universal player.vo.CBSI_Video_Info.

VIDEO_ERROR constant
public static const VIDEO_ERROR:String = "onVideoError"

Events of this type are dispatched when the playback of content or an ad video encounters a fatal error. The data property for an event of this type a CBSI_Video_Info object. To obtain the exact reason for the error look for CBSI_Video_Info.errorinfo. See also com.cbsi.universal player.vo.CBSI_Video_Info.errorInfo VIDEO_PROGRESS constant
public static const VIDEO_PROGRESS:String = "onVideoProgress"

Events of this type are dispatched during playback of content and ad videos every 100 milliseconds. The data property for an event of this type a CBSI_Video_Info object. Events of this type should be listened for to obtain the most accurate video state information. See also com.cbsi.universal player.vo.CBSI_Video_Info VIDEO_STATE CHANGE constant - -
public static const VIDEO_STATE_CHANGE:String = "onStateChange_cbsi"

Events of this type are dispatched during playback of content and ad videos whenever the playback state changes. The data property for an event of this type an integer. For a complete list of supported states and their integer equivalents, see the UVP API at http://videotechnology.cbsinteractive.com/.

Current playback state can also be obtained by polling the current CBSI_Video_Info for the playbackState property. See also com.cbsi.universal player.vo.CBSI_Video_Info.playbackState ---
VIDEO_TRANSITION_COMPLETE constant
public static const VIDEO_TRANSITION_COMPLETE:String = "onVideoTransition-Complete"

---

This constant defines the value of the type property of a CBSI_Player_Event. Events of this type are dispatched when dynamic transition from one stream to another stream of a different bitrate has completed. The data property for an event of this type an Object with one property. Object.index is the index of the CBSI_Video_Info dsiInfo Array that contains the information for the stream that was switched to. See also com.cbsi.universal player.vo.CBSI_Video_Info.dsiinfo ---
VIDEO_TRANSITION_START constant - -
public static const VIDEO_TRANSITION_START:String = "onVideoTransitionStart"

---

Events of this type are dispatched when a dynamic transition from one stream to another stream of a different bitrate is attempted. The data property for an event of this type an object with two properties. Object.index is the index of the CBSi Video_Info.dsiInfo Array that contains the information for the stream being switched to. Object.reason provides the reason for the switch. possible values are "buffer," "bandwidth" or "gpu." See also com.cbsi.universal player.vo.CBSI Video Info.dsiInfo As an example, the event type CONTENT_START is dispatched every time a content clip has started or resumed after an ad. This event can be used to trigger actions, such as a tracking event (described below) or a change to the user interface.

Figure 2:
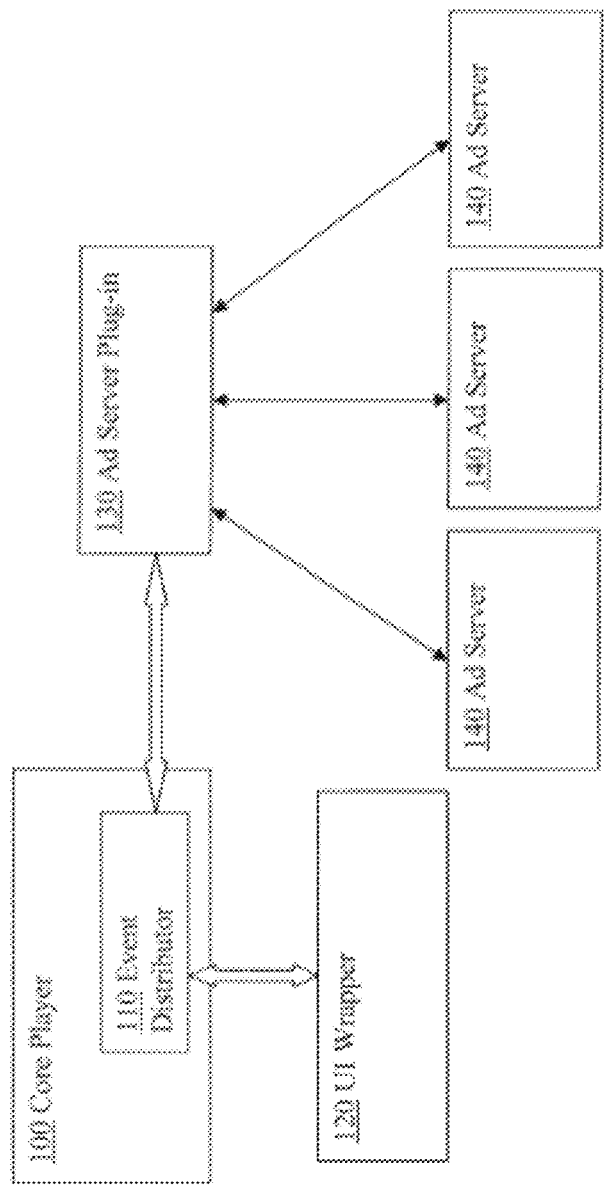
FIG. 2 is a is a schematic diagram of a computer architecture for interfacing ad servers with a media player.

FIG. 2 illustrates embodiments of an architecture including ad server plug-in 130 which can also be implemented as a SWF file. Ad server plug-in 130 communicates using event distributor 110 in the manner set forth above and handles requests to load ads, i.e., "creatives," into ad server plug-in 130. The functions of ad server plug in 130 include loading creatives data from ad servers (typically in XML form), parsing the data, and loading and displaying creatives specified by the creatives data. Ad server plug-in 130 need not know which core video player(s) and/or skin(s) or other elements that it is communicating with. Ad server plug-in 130 registers to receive ad load request events. The ad load request event can include attributes, such as a URL specifying the location of the creatives data, for example one or more ad servers 140. Upon receipt of an ad load request event, Ad server plug-in checks that the request is valid, for example that the specified URL is correct, makes a request to the specified URL, pulls in the creatives data, and displays the creatives.

Figure 6:
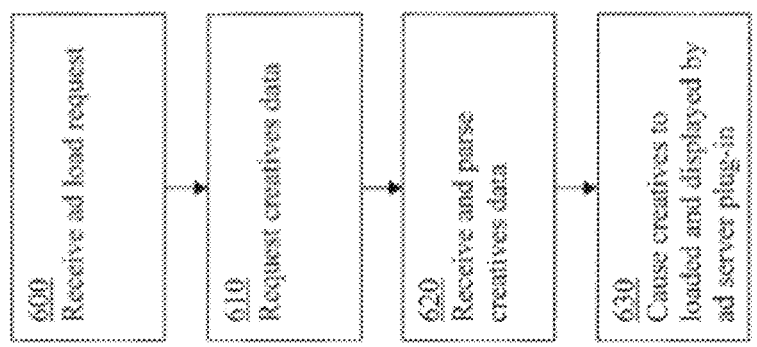
FIG. 6 is a block diagram of a method for sending ads to a media player.

FIG. 6 illustrates a method of operation of ad server plug-in 130. In step 600, an ad load request is received from core media player 100 or another element. The AD LOAD request includes payload data specifying a location, such as a URL, of the creatives data. In step 610, ad server plug-in 130 requests the creatives data from the location. In step 620, ad server plug-in 130 receives and parses the creatives data. In step 630, UI wrapper 120 sends an event that causes the creatives to be loaded and displayed by ad server plug-in 130.

By removing the ad load processing function from core video player 100, the architecture permits creatives data from many different ad servers having many different DOMS to be easily handled. When a new ad server/DOM is introduced into the architecture, a plug-in can be created for that ad server/DOM and registered for events from event distributor 100. Core video player 100, wrapper 110 and other elements need not be modified in any manner to accommodate the new ad server/DOM. For example, an ad in can be created to accommodate ads from the well known DART ad server. The ad-in can be configured to accommodate the specific DOM of DART.

An example of creatives data, in XML format, is set forth below. It can be seen that the creatives data specifies locations and other attributes of the creatives files as well as tracking events which are discussed below. This example is compliant with the VAST standard. Ad server plug-in can be created to parse and act upon any data standard.

---

```
<?xml version-"1.0" encoding="UTF-8" standalone="no"?>
<VAST version="2.0"
xmlns:xsi="http://www.w3.org/2001/XMLSchemainstance"xsi:noNamespaceSchemaLocation="vast.xsd">
    <Ad id="DART DFA">
        <InLine>
            <AdSystem version="2.0">DART</AdSystem>
            <AdTitle>In-Stream Video</AdTitle>
            <Description></Description>
<Survey><! [CDATA[http://ad.doubleclick.net/adj/N270.126913.61022032215
21/B3876671.7jdcadv=2215309jsz=lxljord=988964]]></Survey>
<Impression id="DART"><! [CDA-
TA[http://ad.doubleclick.net/impjv7jXi223626133jOOjOj47414737jO/Oi31349900/31367776/1i
i~aopt=0/0/ff/Oi~ cs=1%3fhttp://sO.2mdn.net/dot.gif]]></Impression>
        <Creatives>
            <Creative sequence-"1" AdID="">
                <Linear>
                    <Duration>OO:00:58</Duration>
                    <TrackingEvents>
                        <Tracking event="start"><! [CDA-
                        TA[http://ad.doubleclick.net/activitYjsrc=2215309jmet=liv=
                        lipid=47414737iaid=223626133iko=OiCid=31349900irid=
```

-continued

```
                31367776irv=1;timestamp=988964ieidl=11iecnl
                lietml=Oi]]></Tracking>
            </TrackingEvents>
            <AdParameters></AdParameters>
            <VideoClicks>
<ClickThrough><! [CDATA[http://www.doubleclick.com/]]></ClickThrough>
    <ClickTrackingid="DART"><! [CDA-
    TA[http://ad.doubleclick.net/click%3Bh%3Dv8/3aOO/3/0/%2a/v%3B223626133%3BO-
    0%3BO%3B47414737%3B255-
0/0%3B31349900/31367776/1%3B%3B%7Eaopt%3DO/0/ff/0%3B%7Esscs%3D%3fhttp://sO.2
mdn.net/dot.gif]] >
    </ClickTracking>
            </VideoClicks>
            <MediaFiles>
                <MediaFile id="1" delivery="streaming"type="video/x-flv"
                bitrate="457 11 width=1I300" height="225">
<! [CDATA[rtmp://rmcdn.f.2mdn.net/ondemand/MotifFiles/html/2215309/dcrm vid-
eo_124155162091750.flvll>
                </MediaFile>
                <MediaFile id= 112 II deli very= "progres-
                sive"type="video/x-flv ll bitrate="457 11 width=1I300"
                height=1I225">
                </MediaFiles>
                </Linear>
            </Creative>
        </Creatives>
    </InLine>
    </Ad>
</VAST>
```

It is becoming more common for creatives data and creatives content to exist on plural servers and under plural formats and DOMS. This permits creatives to be served more quickly and in a more customized manner. Various business logic is created to pull and serve the ads. For example, a player of one domain might want to serve common video ad content along with specialized text subtitles for the domain. Business logic can be created to pull the video content form one ad server and the subtitles form another ad server. In the some embodiments, the business logic can be easily implemented in ad server plug-in 130. Inn FIG. 2, three ad servers 140 are illustrated. Of course, there can be any number of ad servers 140.

Further, business logic can be encoded in wrapper 120, which presents the UI to the user, to display the ads, or other content, in a customized and desirable manner. For example, the physical location and/or the type and arrangement of content can be customized by the skin based on business logic. The business logic can be hardcoded based on needs of the entity associated with wrapper 120 and can include accommodation for profile information based on user interests, activities, and/or time of use. For example, if it is known that a user likes to watch sports on Saturdays, behavior of wrapper 120 can change on Saturday for that user to accommodate this interest in sports. For example, a sports news ticker can be run in the UI.

Event distributor 110 is defined by a shared class. Core video player 100 instantiates event distributor 110 and a runtime instantiation is passed to the other elements, such as wrapper 120 and ad server plug-in 130. As noted above, event distributor 110 is a distributed entity and is defined in the disclosed embodiments by the shared class and, at runtime, by the runtime instantiations. However, instantiation can originate at any entity.

Figure 3:
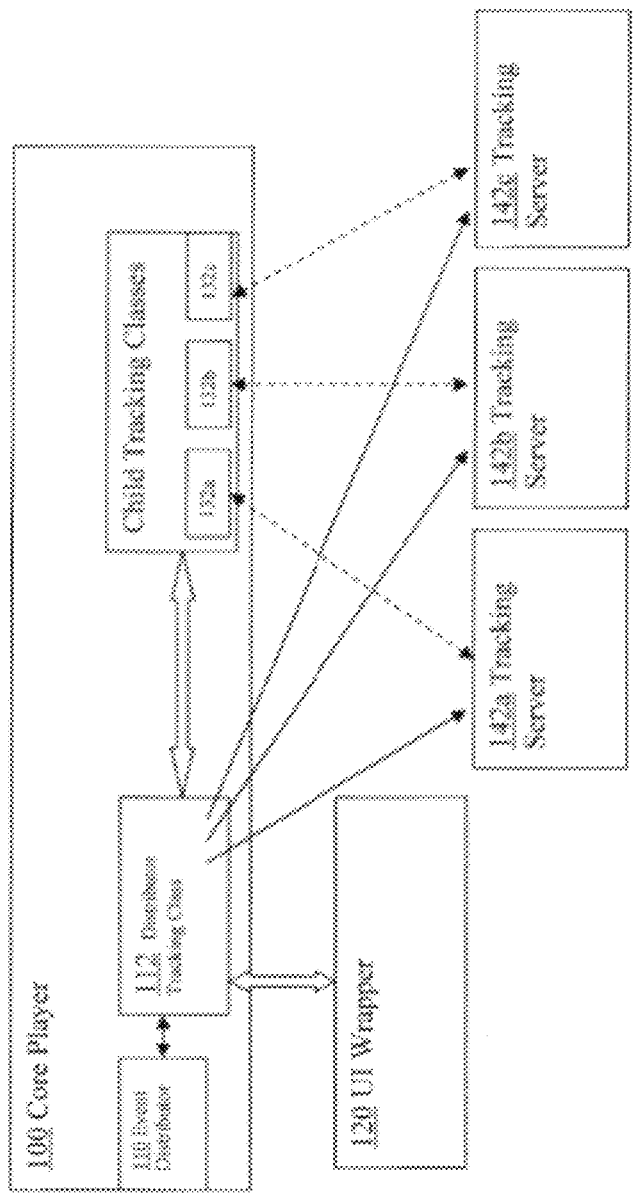
FIG. 3 is a is a schematic diagram of a computer architecture for interfacing tracking servers with a media player.

FIG. 3 illustrates an architecture including a mechanism for tracking usage of core player 100, such as the display and consumption of ads and other content. Usage tracking can be handled with a plug-in a manner similar to ad serving as described above. However, the embodiments of FIG. 3 can use a slight variation on this architecture.

There are various content tracking entities, such as NEILSEN™ and COMSCORE™, that track content usage, such as ad views and clicks, for the purpose of ratings, ad fees, and the like. These content tracking entities want different sets of tracking data in different formats. Also, an entity might want to control which data is sent to a tracking entity for business or political purposes. Again, a flexible architecture is desirable. In FIG. 3, a tracking class 112 is defined. The tracking class listens to event distributor 110 for events that have tracking related data. For each tracking entity (1, 42a, 142b, 142c), there is a corresponding child of the tracking class (132a, 132b, 132c) that communicates with the entity tracking server.

Child classes 132a, 132b, and 132c define tracking interfaces and register with tracking class 112 for events they need. Child classes 132a, 132b, and 132c do not need to know which element is dispatching event. Child classes 132a, 132b, and 132c are constructed to define a subset of tracking data that is to be provided to the corresponding tracking entity as modified by any business or political needs of the other entities related to content consumption and delivery. For example, the child classes can be spawned based on configuration files. Use of any of the child classes can be turned on/off from outside of core player 100. The architecture of FIG. 3 can be used for communication with ad servers and other entities also. Tracking class 112 listens for tracking related events sent by event distributor 110 and sends the appropriate tracking related events to respective child classes 132a, 132b, and 132c. Tracking class 112 essentially maintains a list, or registry, of which events are to be sent to which child classes. Each tracking child populates this registry when the tracking child in constructed.

The example code below defines a data object that wraps information that is sent to tracking server. When tracking class 112 receives an event that has tracking related data, tracking class 112, sends an event to the appropriate child class(es). The child class puts together tracking data for the corresponding tracking server and sends a TRACK_SUBMISSION event with the tracking data and an address, e.g. a URL, of the tracking server as payload. The TRACK_SUBMISSION event is parsed by tracking class 112 and the tracking data is sent to the appropriate tracking server. Tracking class 112 manages data traffic to the tracking servers. The code below is used to generate the TRACK_SUBMISSION event.

```
Package
Class
    com.cbsi.universal player.track
    public class TrackSubmission
    Public Properties
    Property
    dataURL : String            defined by: TrackSubmission
    eventType : String          defined by: TrackSubmission
    10adsPixel : Boolean        defined by: TrackSubmission
    trackingEntity : String         defined by: TrackSubmission
    Public Methods
    Method
    TrackSubmission( data: String, evt: String, tName:String, pix:Boolean = false) Constructor.  Defined by: TrackSubmission
    Property detail
        dataURL property
        public var dataURL:String
        eventType property
        public var eventType:String
        loadsPixel property
        public var loadsPixel:Boolean
        trackingEntity property
        public var trackingEntity:String
    Constructor detail
        TrackSubmission ( ) constructor
        public function TrackSubmission(data:String, evtString, tName:String,
        pix:Boolean = false)
    Constructor.
    Parameters
        data: String The fully-qualified url of the server to which the
        trackinformation should be sent
        evt: String - The Event Type that generated the track submission
        tName: String - The UVP entity that is sending the track submission
        pix: Boolean (default = false) - A Boolean that determines whether or not this
        tracksubmission requires that a 1 x 1 pixel gif be loaded from the tracking server.
```

Figure 4:
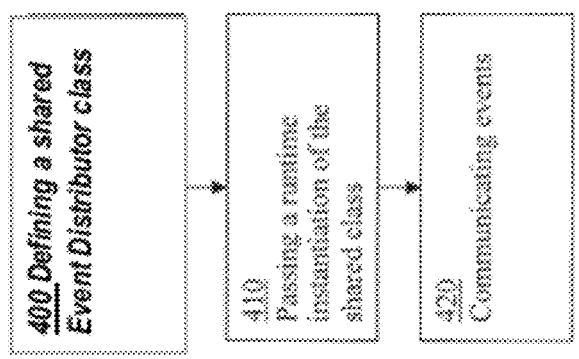
FIG. 4 is a block diagram of an operating mode of the architecture of FIG. 2.

FIG. 4 illustrates a method of communication between the elements of the architecture of FIG. 2. In step 400 A shared class is created in an object oriented programming language to define event distributor 110. The shared class defines a set of standard events for communication with the other elements. In steps 410, a runtime instantiation of the shared class is passed to at least one other element, such as wrapper 120. In step 420, at least one event is communicated to the runtime instantiation.

Figure 5:
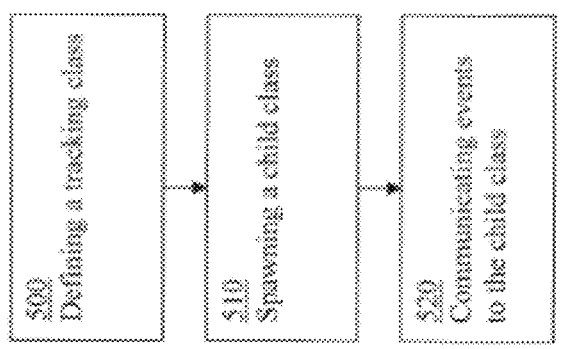
FIG. 5 is a block diagram of an operating mode of the architecture of FIG. 3.

FIG. 5 illustrates a method of communication between the elements of the architecture of FIG. 3. In step 500, the tracking class of the core player 100 is defined. In step 510, a child class is spawned for a specified tracking entity. In steps 520, the tracking class listens to event distributor 110 for events that have tracking related data. In step 530, events are communicated to a child class of a tracking entity. Subsequently, the child class can send the TRACKSUBMISSION event to tracking class 112, which can be parsed and sent to the tracking server.

The disclosed embodiments can be compliant with any advertising format or standard. For example, the disclosed embodiments can be compliant with VAST, which is promulgated by IAB. The embodiments can also support the VPAID API.

The embodiments can be in the form of functional modules which include software code executed on a computer processor of computer hardware devices. The software code can be recorded on a tangible media in a form that, when executed by a processor, carries out the specified functions. The embodiments have been described through an object oriented programming language, such as ActionScript or Java. However, any computer programming language can be used.

Any type of events and any form of payload data can be used based on functional requirements of the architecture.

Any computing devices can be used to carry out the disclosed functions, such as programmed general purpose computers. The core player can be configured for any type or format of media. The event distributor can communicate with any type of device associated with any party for any purpose associated with the rendering of media.

The present technology can take the forms of hardware, software or both hardware and software elements. In some implementations, the technology is implemented in software, which includes but is not limited to firmware, resident software, microcode, a Field Programmable Gate Array (FPGA), graphics processing unit (GPU), or Application-Specific Integrated Circuit (AS-IC), etc. In particular, for real-time or near real-time use, an FPGA or GPU implementation would be desirable.

Furthermore, portions of the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be non-transitory (e.g., an electronic, magnetic, optical, electromagnetic, infrared, or semiconductor system (or apparatus or device)) or transitory (e.g., a propagation medium).

Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

Figure 7:
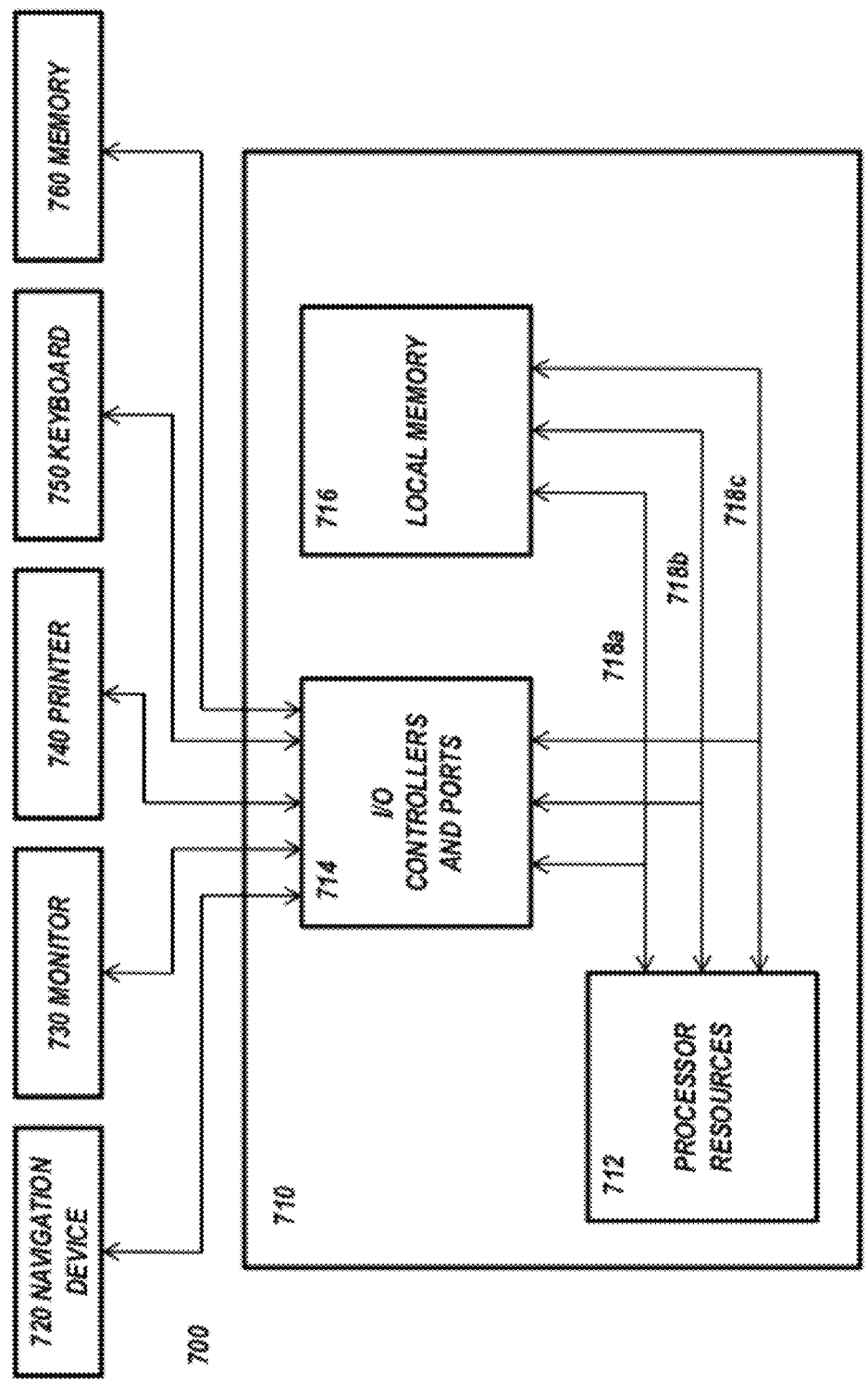
FIG. 7 illustrates a data processing architecture suitable for storing a computer program product of the present technology and for executing the program code of the computer program product.

Referring to FIG. 7, a data processing system (e.g., 700) suitable for storing a computer program product of the present technology and for executing the program code of the computer program product can include at least one processor (e.g., processor resources 712) coupled directly or indirectly to memory elements through a system bus (e.g., 718 comprising data bus 718a, address bus 718b, and control bus 718c). The memory elements can include local memory (e.g., 716) employed during actual execution of the program code, bulk storage (e.g., 760), and cache memories (e.g., including cache memory as part of local memory or integrated into processor re-sources) that provide temporary storage of at least some program code in order to reduce the number of times code must be retrieved from bulk storage during execution. Input/output or I/O devices (including but not limited to keyboards 750, displays 730, pointing devices 720, etc.) can be coupled to the system either directly or through intervening I/O controllers (e.g., 714). Net-work adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

We claim:

1. A computer implemented method for event-based communication in a media player architecture comprising:
   instantiating, by a computer device, a core media player to perform playback of media content and a wrapper to provide a user interface for the core media player, the wrapper implemented as a separate file from the core media player and the wrapper provides a media player skin and a defined business specific logic that dynamically customizes the generation and placement of user interface objects within the user interface associated with the media player skin, the user interface objects providing controls for controlling playback of media using the media player;
   registering, by an event distributor executing on the computer device, the wrapper as an event subscriber to receive event notifications associated with different events performed at the core media player;
   registering, by the event distributor, the core media player as an event issuer to issue event notifications based on events occurring at the core media player;
   registering, by the event distributor, an event handling process associated with each event notification, wherein the event handling process identifies steps for handling each received event notification;
   spawning a plurality of child classes to listen to the event distributor for tracking-related data, each of the plurality of child classes defined to track a different subset of data and each of the plurality of child classes to generate tracking data for a different tracking server;
   receiving by the event distributor executing on the computer device, an event notification generated by the registered core media player executing on the computer device;
   processing, by the event distributor, the received event notification based in part on the defined event handling process associated with the received event notification; and
   transmitting the processed event notification to the registered wrapper registered to receive the event notification;
   transmitting the processed event notification to a subset of the plurality of child classes defined to track the event notification; and
   transmitting, by each of the subset of the plurality of child classes, the processed event notification to an associated tracking server.

2. The method of claim 1, further comprising:
   receiving instructions associated with a new type of core media player event that is not in the set of core media player events; and
   updating the set of core media player events with the new type of core media player event based in part on the received instructions.

3. The method of claim 1, further comprising:
   responsive to receiving a request from an ad server plug-in, registering the ad server plug-in as an event subscriber, wherein the ad server plug-in load ads in response to requests from the event distributor;
   receiving, via the channel, a request to load an ad in the wrapper, the request transmitted from the ad server plug-in;
   processing, by the event distributor, the received request based in part on an associated event handling process;
   transmitting, by the ad server plug-in, the request to load an ad to the wrapper registered to receive the request; and
   providing, by the ad server plug-in, the ad to the wrapper registered to received the request.

4. A non-transitory computer-readable storage medium for an event-based communication in a media player architecture, the non-transitory computer-readable storage medium storing instructions that when executed by a processor cause the processor to:
   instantiate, by a computer device, a core media player to perform playback of media content and a wrapper to provide a user interface for the core media player, the wrapper implemented as a separate file from the core media player, and the wrapper provides a media player skin and a defined business specific logic that dynamically customizes the generation and placement of user interface objects within the user interface associated with the media player skin, the user interface objects providing controls for controlling playback of media using the media player;
   register, by an event distributor executing on the computer device, the wrapper as an event subscriber to receive event notifications associated with different events performed at the core media player;
   register, by the event distributor, the core media player as an event issuer to issue event notifications based on events occurring at the core media player;
   register, by the event distributor, an event handling process associated with each event notification, wherein the event handling process identifies steps for handling each received event notification;
   spawn a plurality of child classes to listen to the event distributor for tracking-related data, each of the plurality of child classes defined to track a different subset of data and each of the plurality of child classes to generate tracking data for a different tracking server;

receive, by the event distributor executing on the computer device, an event notification generated by the registered core media player executing on the computer device;

process, by the event distributor, the received event notification based in part on the defined event handling process associated with the received event notification; and transmit the processed event notification to the registered wrapper registered to receive the event notification;

transmitting the processed event notification to a subset of the plurality of child classes defined to track the event notification; and transmitting, by each of the subset of the plurality of child classes, the processed event notification to an associated tracking server.

5. The non-transitory computer-readable storage medium of claim 4, further comprising:

receiving instructions associated with a new type of core media player event that is not in the set of core media player events; and updating the set of core media player events with the new type of core media player event based in part on the received instructions.

6. The non-transitory computer-readable storage medium of claim 4, wherein the wrapper provides media player skin and a defined business specific logic.

7. The non-transitory computer-readable storage medium of claim 4, further comprising:

responsive to receiving a request from an ad server plug-in, registering the ad server plug-in as an event subscriber, wherein the ad server plug-in load ads in response to requests from the event distributor;

receiving, via the channel, a request to load an ad in the wrapper, the request transmitted from the ad server plug-in;

processing, by the event distributor, the received request based in part on an associated event handling process;

transmitting, by the ad server plug-in, the request to load an ad to the wrapper registered to receive the request; and providing, by the ad server plug-in, the ad to the wrapper registered to received the request.

8. A system for event-based communication in a media player architecture, the system comprising:

a processor, and a non-transitory computer-readable storage medium storing instructions that when executed by the processor cause the processor to:

instantiate, by a computer device, a core media player to perform playback of media content and a wrapper to provide a user interface for the core media player, the wrapper implemented as a separate file from the core media player, and the wrapper provides a media player skin and a defined business specific logic that dynamically customizes the generation and placement of user interface objects within the user interface associated with the media player skin, the user interface objects providing controls for controlling playback of media using the media player;

register, by an event distributor executing on the computer device, the wrapper as an event subscriber to receive event notifications associated with different events performed at the core media player;

register, by the event distributor, the core media player as an event issuer to issue event notifications based on events occurring at the core media player;

register, by the event distributor, an event handling process associated with each event notification, wherein the event handling process identifies steps for handling each received event notification;

spawn a plurality of child classes to listen to the event distributor for tracking-related data, each of the plurality of child classes defined to track a different subset of data and each of the plurality of child classes to generate tracking data for a different tracking server;

receive, by the event distributor executing on the computer device, an event notification generated by the registered core media player executing on the computer device;

process, by the event distributor, the received event notification based in part on the defined event handling process associated with the received event notification; and transmit the processed event notification to the registered wrapper registered to receive the event notification;

transmit the processed event notification to a subset of the plurality of child classes defined to track the event notification; and transmit, by each of the subset of the plurality of child classes, the processed event notification to an associated tracking server.

9. The system of claim 8, further comprising:

receiving instructions associated with a new type of core media player event that is not in the set of core media player events; and updating the set of core media player events with the new type of core media player event based in part on the received instructions.

10. The system of claim 8, further comprising:

responsive to receiving a request from an ad server plug-in, registering the ad server plug-in as an event subscriber, wherein the ad server plug-in load ads in response to requests from the event distributor;

receiving, via the channel, a request to load an ad in the wrapper, the request transmitted from the ad server plug-in;

processing, by the event distributor, the received request based in part on an associated event handling process;

transmitting, by the ad server plug-in, the request to load an ad to the wrapper registered to receive the request; and providing, by the ad server plug-in, the ad to the wrapper registered to received the request.

* * * * *